INVENTORS
WILLIAM F. HOPE
ERNEST U. LANG

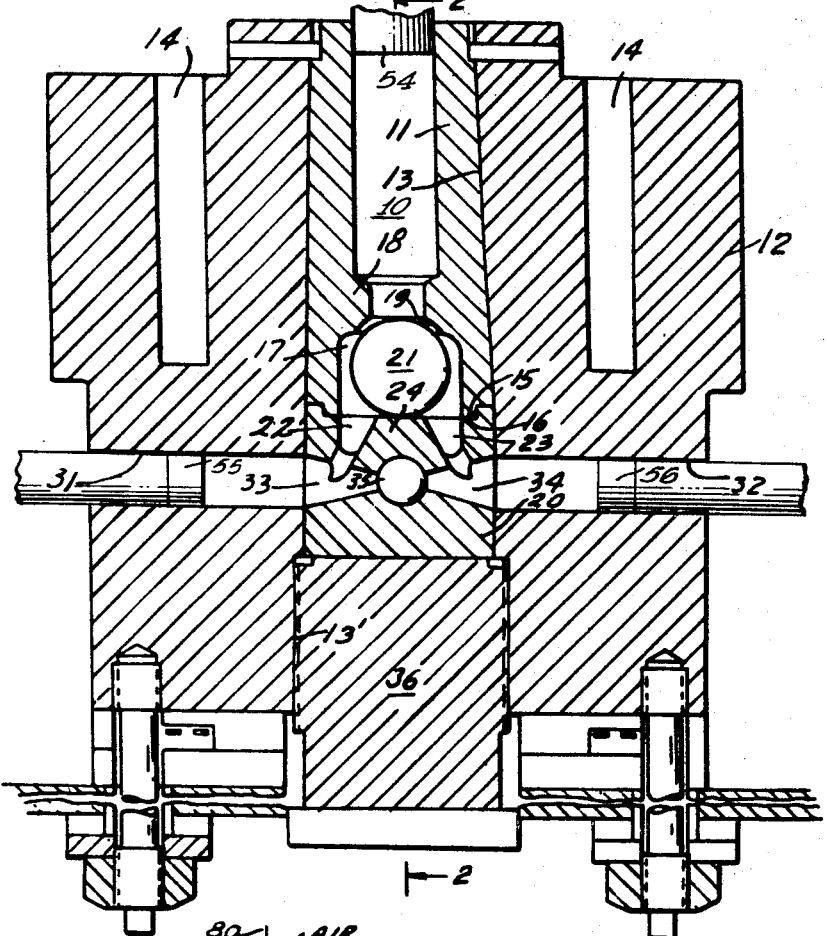
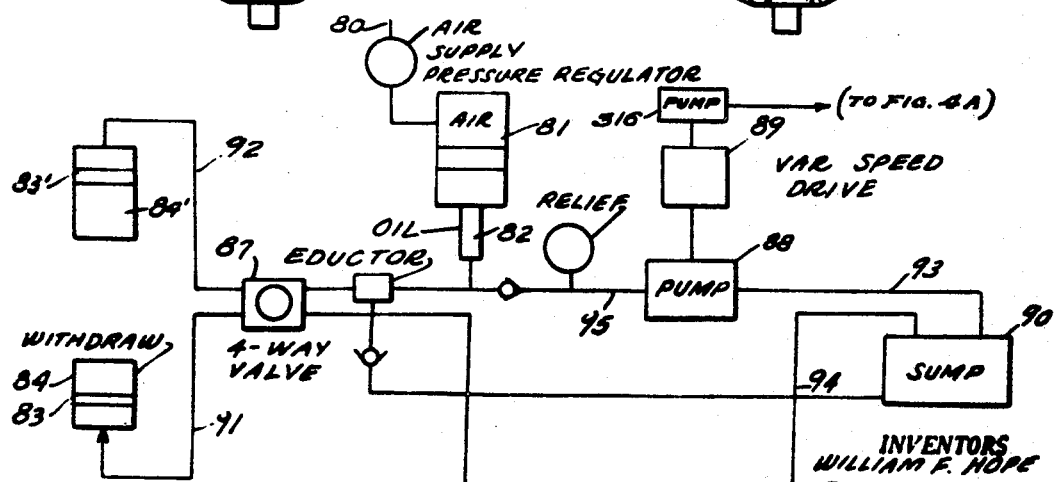

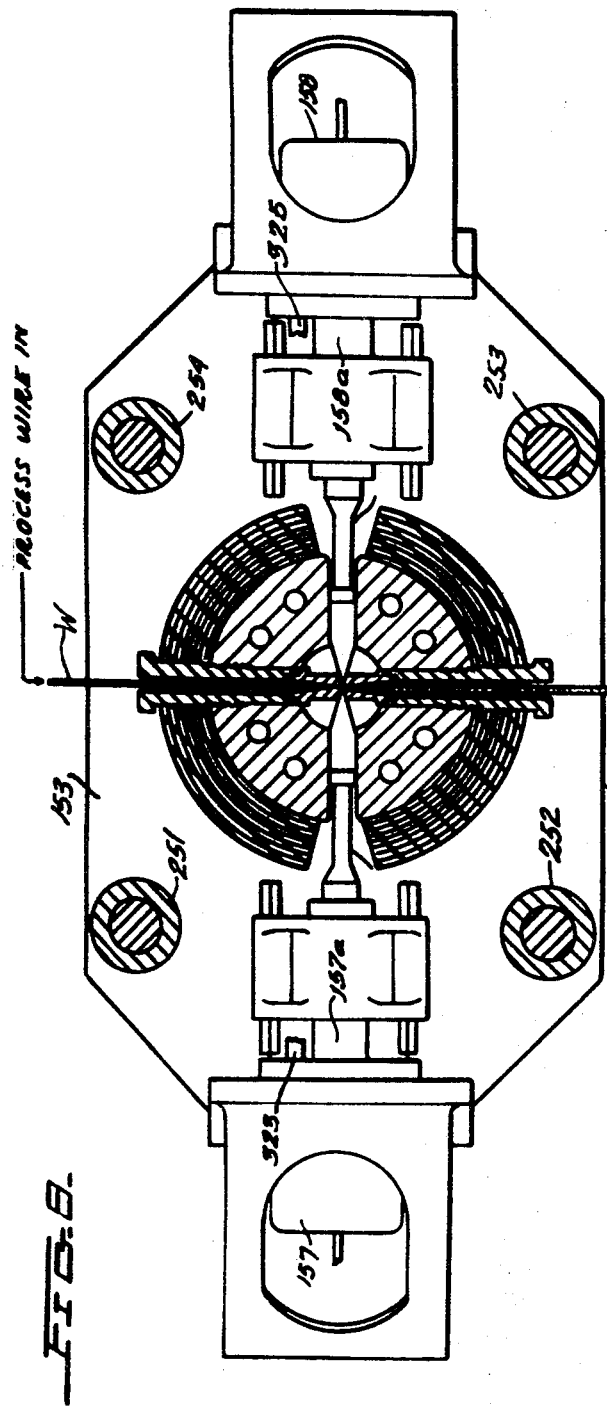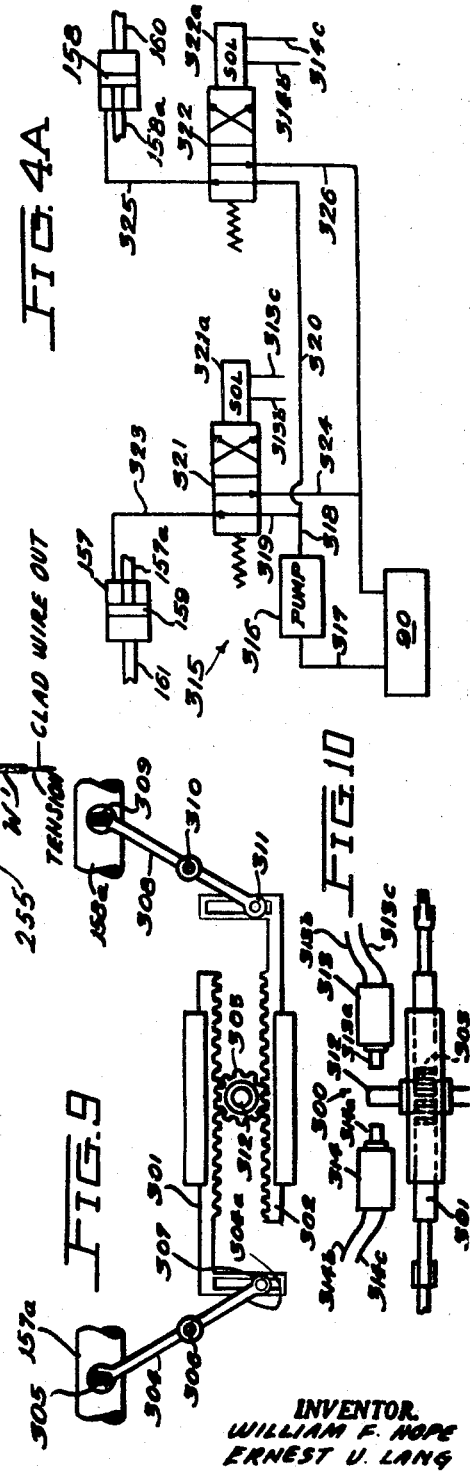

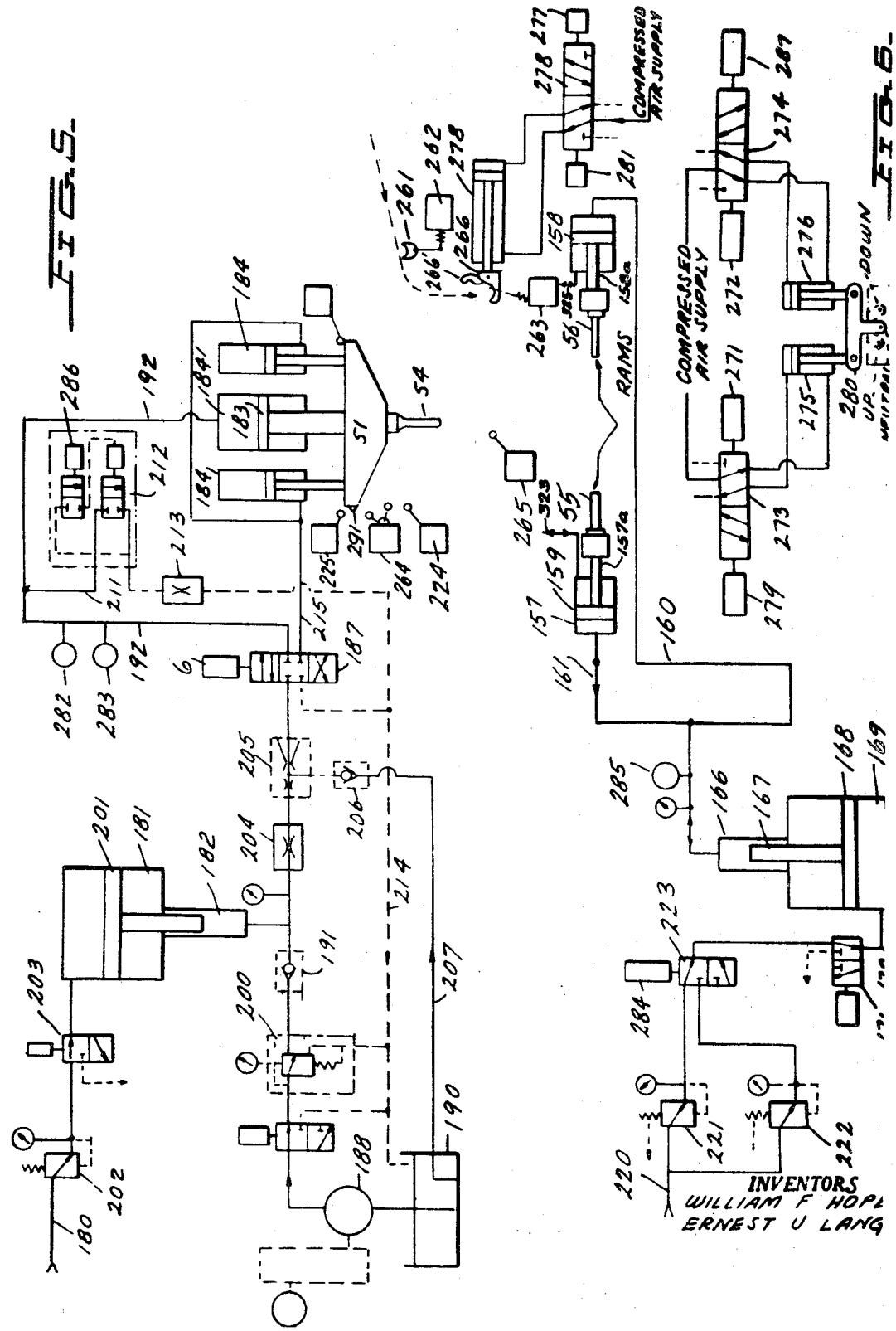

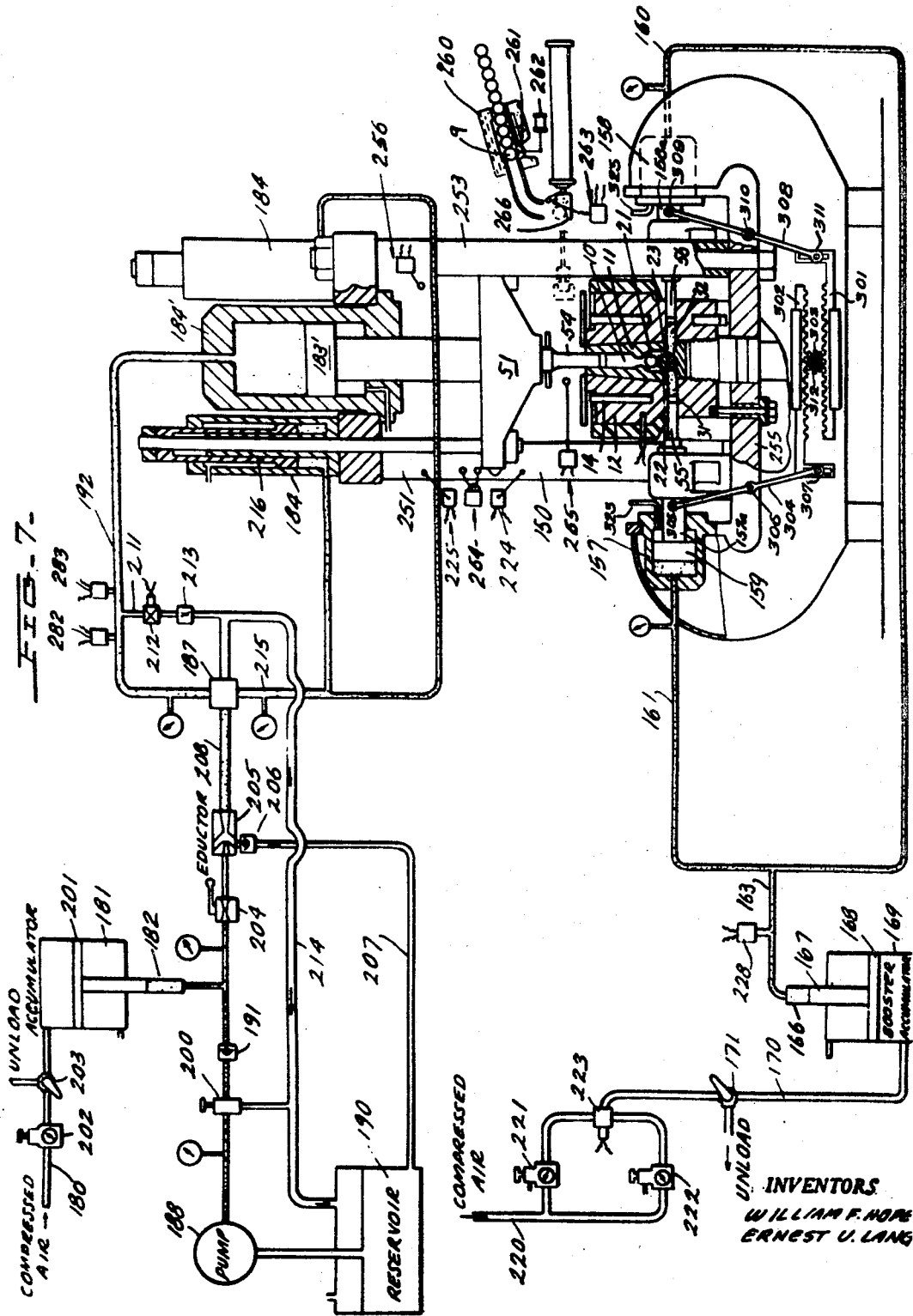

3,474,654
APPARATUS FOR CONTINUOUS EXTRUSION
Ernest U. Lang and William F. Hope, Niles, Mich., assignors to National Standard Company, a corporation of Delaware
Continuation of application Ser. No. 506,054, Nov. 2, 1965. This application June 10, 1968, Ser. No. 739,906
Int. Cl. B21c 23/30
U.S. Cl. 72—258   8 Claims

ABSTRACT OF THE DISCLOSURE

Apparatus for continuously bonding an extruded aluminum cladding to a steel core wire by means of an extruder which has a main billet chamber and a pair of accumulator chambers, so that as aluminum is extruded onto the wire from the billet chamber it is also forced into the accumulator chambers, together with means for extruding from the accumulator chambers onto the wire while the billet chamber is being recharged, and means for equalizing the rate of travel of rams in the accumulator chamber on their extruding stroke and on their return stroke to maintain equal flow of aluminum to the wire at all times.

---

This application is a continuation of Ser. No. 506,054, filed Nov. 2, 1965, now abandoned.

The apparatus of this invention has found especial application in the continuous bonding of an extruded aluminum jacket about a steel wire to provide an aluminum clad steel wire which may be reduced by drawing without breaking the bond between the steel and the aluminum.

In the art of continuously extruding a metal such as aluminum it has been found necessary to reduce the amount of aluminum being extruded during the portion of the cycle when each successive billet is being loaded into the receiver. To produce a firmly bonded aluminum clad steel wire all variables must be closely controlled, and such variations in the amount of aluminum being extruded cannot be tolerated.

It is an object of the invention to provide an apparatus which provides a continuously uniform flow of metal into the extrusion chamber.

Since it is necessary to have uniform flow characteristics in the extrusion chamber in order to produce a concentric cladding, it is an object of this invention to provide diametrically opposed inlets into the extrusion chamber.

A further object of the invention is to provide, with a billet chamber, diametrically opposed accumulating chambers cooperating with the diametrically opposed inlets to the extrusion chamber. These accumulating chambers have adequate capacity to permit a continuously uniform flow of metal into the extrusion chamber during the portion of the cycle when a new billet is being loaded into the billet chamber.

A further object of the invention is to provide a means by which the rams in the accumulating chambers maintain a balanced relationship regardless of the direction in which they are moving.

A still further object of the invention is to provide a fully automatic control based upon the utilization and sensing of hydraulic pressures.

A very satisfactory arrangement employs two accumulating chambers on opposite sides of the extrusion chamber at approximately right angles to the billet chamber. Obviously three, four or more accumulating chambers may be employed, symmetrically disposed; for example, conically positioned at the same angle to or in a plane approximately at right angles to the axis of the main extrusion chamber and around the extrusion chamber. Each accumulating chamber is provided with a ram or piston or similar pressure applying means and with means to apply controlled pressure to the ram or piston.

Suitable automatic or semi-automatic controls may be provided to determine or effect the change over from extrusion by the pressure of the billet chamber to extrusion by pressure from the accumulating chambers. During the stroke in the billet chamber, there is just enough back pressure on the accumulating chambers so that the combination of these resulting forces and the frictional forces on the accumulating rams as they are forced outward is adequate to achieve the required extrusion effect to produce a firmly bonded aluminum clad steel wire. Rapid change over from pressure from the billet chamber to pressure from the accumulating chambers is made when the stroke of the ram in the billet chamber is nearly exhausted. The pressure on the accumulating rams is then increased to maintain the extruding pressure, the increase of pressure taking into account the change in direction of the frictional forces on the accumulating rams, etc. While the metal is extruded from the accumulating chambers the billet chamber is reloaded.

The metal being extruded is heated to a temperature sufficient to make it susceptible to plastic flow at high pressure but preferably insufficient to melt the metal. For extruding aluminum or alloys which are predominantly aluminum, which may have a melting point of from about 1,000° F. to about 1,250° F. for example, the metal should be heated to about 900° F. to about 1,050° F. depending on its melting point. With low melting brasses the temperature of the metal is maintained at about 1,200–1,300° F.

In the accompanying drawings:

FIG. 1 is a cross-sectional view of basic chamber structure of an apparatus made according to the invention taken along a vertical plane at right angles to the direction of extrusion;

FIG. 4 is a diagram of the main ram high pressure system;

FIG. 4a is a diagram of the auxiliary ram centering control system;

FIG. 5 is a partly diagrammatic view showing a substantially complete operating circuit with certain stationary parts of the apparatus omitted;

FIG. 6 is a detail view of a portion of the apparatus (labeled 6) of FIG. 5;

FIG. 7 is a view similar to FIG. 5 with the essential stationary parts of the apparatus added and with details of the operating circuit omitted;

FIG. 8 is a cross-sectional view through the nozzle and accumulating chambers of FIG. 5;

FIG. 9 is a front elevational view of the sensing means for the auxiliary ram centering control system; and FIG. 10 is a plan view of said sensing means.

Figure 2:
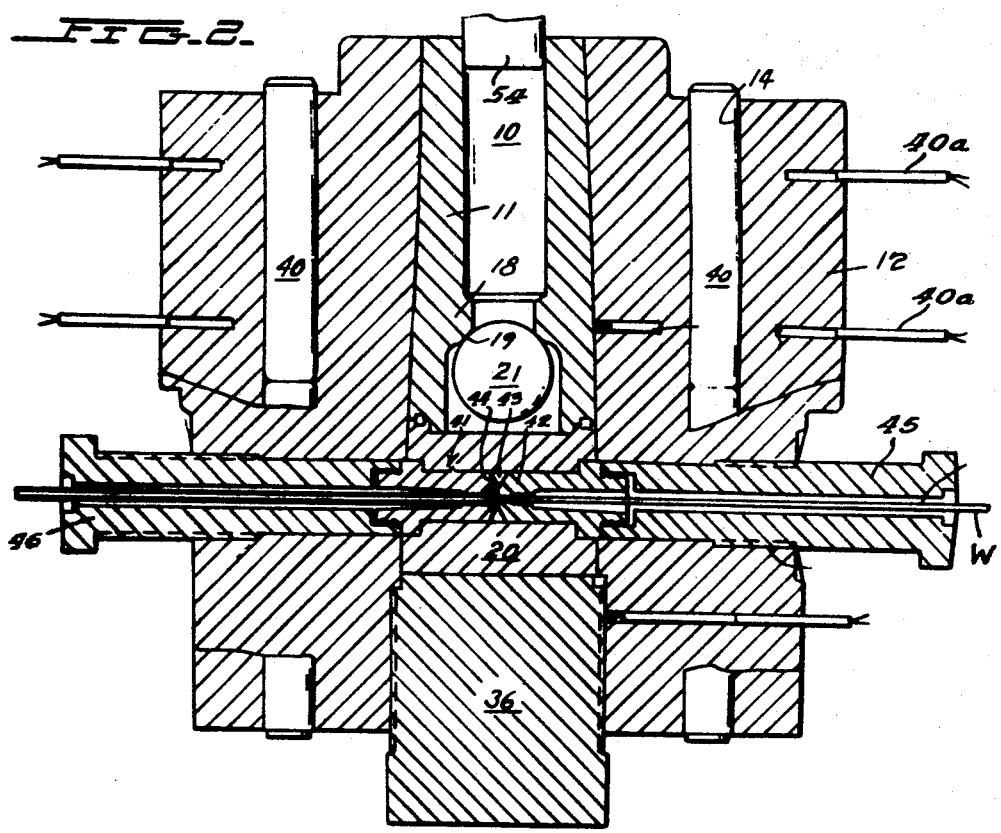
FIG. 2 is a cross-sectional view taken along line 2—2 of FIG. 1.

The apparatus consists generally of a three ram extruder apparatus that includes a billet chamber 10 with a main ram 54, and accumulator chambers 31 and 32 with auxiliary side rams 55 and 56, which cooperate to supply heated, but solid, soft metal under high pressure continuously to an extrusion die head 41 where it is firmly bonded to a continuous hard metal core, such as a wire W, to produce a clad wire W1 (see FIGS. 1 to 3, 7 and 8).

Operation of the rams for continuous extrusion is effected through a combination of hydraulic cylinder and piston units which are controlled by a system of limit switches and related circuitry, together with solenoid fluid valves in high pressure hydraulic circuits which, in certain cases, are boosted by high pressure air systems (see FIGS. 4, 5, 6 and 7).

In addition, rate of travel of the auxiliary rams is coordinated to assure concentricity of cladding by a sensing means and low pressure hydraulic circuit illustrated in FIGS. 4a, 9 and 10.

Preheated billets of soft metal are automatically fed into the billet chamber by a feed apparatus seen in FIG. 7.

A billet chamber 10 is formed in a block 11 made of an alloy which has good strength at the temperature of extrusion. The outer portion of block 11 is tapered and is held and supported with the larger side towards the extrusion end by a die casing 12 which has a tapered bore 13 matching the taper of the chamber block or liner 11. The die casing 12 is also provided with several or a plurality of cavities 14 adapted to receive electric heating elements 40 (see FIG. 2).

The liner block 11 has an annular shoulder 15 adapted to fit into an internal shoulder 16 of a die holder 20. The lower portion of the billet chamber 10 in block 11 has an internal flange 18 constricting the passage and below the flange 18 is an enlarged valve chamber 17 for a ball check 21. The lower edge of the flange 18 may comprise a valve seating ring 19 with a spherical concavity adapted to closely fit the ball 21 and to seal the passage between valve chamber 17 and billet chamber 10 when back pressure is applied to ball 21. The lower end of valve chamber 17 opens into two extrusion passages 22 and 23 of the die holder 20. Between the passages 22 and 23 is a lower rest portion 24 for the ball check 21 formed in the die holder 20. The device is provided with two accumulating chambers 31 and 32, and the passages 22 and 23 open into or close to nozzle portions 33 and 34 of the chambers 31 and 32, respectively. The small inner ends of nozzle portions 33 and 34 open into a die cavity 35. In FIG. 1, the ram for the main extrusion chamber 10, the pistons for the accumulating chambers 31 and 32, the die which is fitted into the cavity 35, etc., have been omitted to show the basic structure. One or more thermocouples 40a are provided to control the heating of the billet by the heating elements 40.

The die holder 20 is supported from the bottom by a block 36, which fits into a lower part 13' of the central opening in the die casing 12.

FIG. 2 is taken along the axis of a die head indicated generally at 41, in which a steel wire W, which enters from the right, is clad with soft metal. The axis of the die head is perpendicular to a projection of the axis of billet chamber 10, and midway between the inner ends of the nozzle portions 33 and 34 of the accumulator chambers. The die head includes a male die 42 which guides the wire W into an extruder passage 43 on the axis of the die, and a female die 44 which is spaced from the male die compresses the soft metal around the wire and bonds them together. The die head is retained in the die casing 12 by hollow bolts 45 and 46 through which the wire W passes as it enters and leaves the die head.

Figure 3:
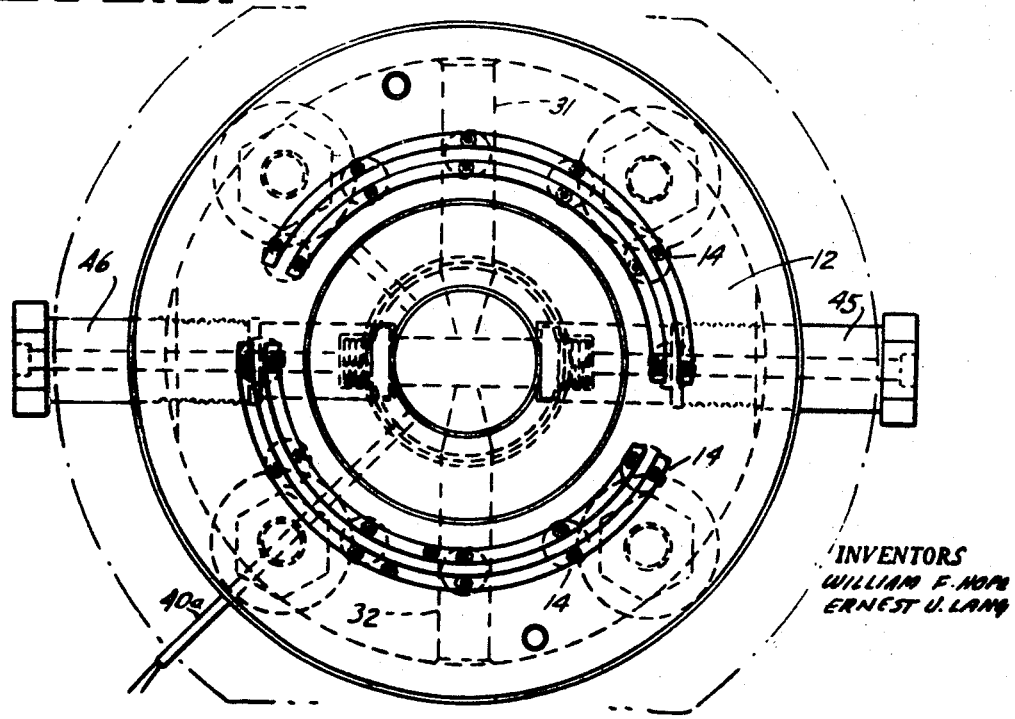
FIG. 3 is a top plan view of the device of FIGS. 1 or 2.

The way in which the basic structure of FIGS. 1–3 is associated into a machine is illustrated in FIG. 7. The machine comprises frame members 251, 253 and 255. The casing 12 and its contents are fixed to the lower frame member 255. A main ram 54 for the billet chamber 10 is mounted on a cross head 51 which has its extruding stroke imparted by cylinder 184' and piston 183'. Auxiliary rams 55 and 56 for the accumulating chambers 31 and 32 are controlled by cylinder and piston units 157 and 158, respectively. The auxiliary ram 55, for example, is fixed to a piston 159 of unit 157 by a piston rod 157a, while the auxiliary ram 56 is fixed to a similar piston rod 158a of the unit 158. A high pressure hydraulic system includes lines 160 and 161 through which hydraulic fluid is supplied, respectively to the units 158 and 157.

Lines 160 and 161 are connected to a common fluid line 163 which is fed from a chamber 166 by means of a piston 167 which is connected to piston 168 of an air pressure chamber 169. Air pressure applied to chambers 169 is controlled through a line 170 which is equipped with a control valve 223. In a typical installation the ratio of piston 168 to 167 is 44:1 and the ratio of piston 159 to piston 55 is 19:1 so that the ratio of pressure applied through air supply line 170 to that applied to piston shaft 56 is approximately 836:1.

Air is supplied to the booster accumulator 169 through line 220 and one of two pressure regulators 221 and 222. Regulator 221, for example, is a low pressure regulator adapted to supply the relatively lower back pressure required when accumulator chambers 31 and 32 are being charged with metal and pistons or rams 55 and 56 are being retracted. Pressure regulator 222 is a high pressure regulator adapted to supply pressure necessary to force rams 55 and 56 toward each other to take over the extrusion job when main ram 54 is being retracted. The three-way air control valve 223 determines which one of regulators 221 or 222 operates at any given moment.

A simplified type of control system for main plunger 54 is illustrated diagrammatically in FIG. 4. This system is based on air pressure from line 80 to air cylinder 81 which controls the oil pressure from cylinder 82. Oil from cylinder 82 applies pressure to plunger 54 through line 92 and piston 83' of cylinder 84'. Since a very large force is required to remove the plunger 54 out of the chamber 10, the system is constructed so that the oil from cylinder 82 under high pressure may also be employed to withdraw plunger by means of line 91 and piston 83. The control is effected through a four way valve 87. The eductor is adapted to supply additional oil from sump 90 to move the plunger 54 more rapidly after it leaves the chamber 10 or when the resistance of chamber 10 to the movement of the plunger outward decreases. The variable speed drive 89 of the pump 88 is advantageous since it avoids the necessity of by-passing large amounts of oil when the movement of the piston 54 in either direction is slow.

FIG. 7 includes the pressure system of FIG. 4 in somewhat more detail. The high pressure lines of this system of FIG. 7 have been stippled to aid in understanding the operation of the system.

Hydraulic pressure is supplied the circuit of the charging or main ram 54 by a variable volume of variable speed pump 188. The volume output of the pump 188 is selected to approximate or, to be on the safe side, to slightly exceed the desired average extrusion rate. A relief valve 200 is provided and is adjusted to open at a pressure which is at or slightly above the maximum pressure desired. This valve opens whenever the piston 201 reaches the top of chamber 181. In addition to pump 188, an accumulator 181 also helps maintain the final system pressure and the air chamber of this accumulator serves to dampen sudden surges or shock in the system. Check valve 191 prevents oil of chamber 182 from feeding back to pump 188. The pressure in chamber 182 of accumulator 181 is regulated by the air pressure on piston 201 which in turn is controlled by a precision air pressure regulator 202 in line 180. An unloading valve 203 is also provided in line 180. A pressure compensated, adjustable hydraulic flow control regulator 204 regulates the speed of the system. When there is little resistance to movement of the piston 183' and ram 54, fast ram traverse is obtained automatically by the eductor 205. This eductor 205 draws additional fluid from the reservoir 190 through line 207 and check valve 206 as long as ram 54 does not meet with any resistance. When pressure builds up in cylinder 184' and line 208, the check valve 206 closes and the ram 54 operates at its normal high pressure speed. The valve 187 is a 4-way, 3-position, closed center, hydraulic valve, the position of which determines the movement and direction of the ram 54. In a first position of valve 187, the ram 54 remains stationary in a second position the ram 54 moves downwardly and in the third position, the ram is retracted. In the position to feed the line 192, the ram 54 is moved downwardly. Line 192 supplies the hydraulic fluid to cylinder 184', contains hydraulic pressure switches 282 and 283 and is connected to return flow line 211. Line 211 is a bleed-down line containing regulating devices such as the hydraulic valve 212 and flow control means 213 which can return fluid to reservoir 190 through line 214. When the valve 187 is in a position to feed line 215, the pistons 216 of cylinders 184 operate to retract the ram 54. Cylinders 184 are supported between 251–252 and 253–254, respectively.

For rapidly extruding a series of billets 9 through the machine, it is necessary to preheat the billets to about the temperature of chamber 10 before introduction into said chamber. The billets can be introduced manually but the automatic device shown at the right hand side of FIG. 7 is more satisfactory. A series of the cylindrical billets is heated in the preheater 260, fed one by one by the device 261, 262 to the billet transfer device 266 and conveyed by tre transfer device to the chamber 10 as will be described hereinafter in connection with the description of an automatic operating cycle as carried out by the apparatus shown in FIGS. 5 and 6.

As previously indicated, it is very important to control the rate of travel of the auxiliary rams so that they stay in phase both on the extruding stroke and on the return, because if they do not it can cause unequal pressure of metal on opposite sides of the wire W in the extruding head with resultant lack of concentricity of the cladding on the steel core. Control of auxiliary ram travel is accomplished by the means illustrated in FIGS. 4a, and 10.

The auxiliary rams 55 and 56 are moved through the extruding stroke by high pressure fluid from the lines 160 and 161. On the return stroke, the friction of the rams provides a controlled back pressure against the force exerted by the soft metal as it is delivered by the main ram 54 into the accumulator chambers 31 and 32. However, there are a variety of variable factors which may cause one auxiliary ram to move faster than the other either on the extruding stroke or on the return stroke. In order to compensate for any such speed variations, the system is provided with sensing means, illustrated in FIGS. 9 and 10, and indicated generally by the reference numeral 300. The sensing means acts to control the operation of a low pressure hydraulic system, indicated generally at 315, which is illustrated diagrammatically in FIG. 4a. The operation of the system will be described first, after which the elements of the system will be described in detail.

It is apparent that if, for example, the ram 55 moves faster during an extrusion stroke than does the ram 56, it is closer to the wire W than is the ram 56, and either the ram 55 must be retarded or the ram 56 must be accelerated. In the present system the ram 55 is retarded until the ram 56 catches up with it, after which the retarding force on the ram 55 is eliminated. On a return stroke, if we assume that the ram 55 is lagging behind the ram 56, it is again closer to the wire than is the ram 56, and the system works to accelerate the ram 55 until it catches up with the ram 56. This permits a single simple hydraulic system to perform both functions.

Referring to FIGS. 9 and 10, the sensing means 300 includes an upper rack member 301, a lower rack member 302, and a pinion 303 which meshes with both racks and is free to move along them so that its position on the racks depends upon their relative rates of movement. As long as the two racks move at the same speed the pinion stays in a neutral position which is in a vertical plane through the wire W, while a greater speed of one rack than the other causes the pinion to move one way or the other from the neutral position.

The upper rack 301 is operatively connected with the piston rod 157a of the cylinder and piston unit 157 by means of a lever 304 which is pivoted to the piston rod 157a at 305, which is fulcrumed at 306, and which makes a pin and slot connection 307 with the left-hand end of the upper rack 301.

Similarly, the lower rack 302 is operatively connected with the piston rod 158a of the cylinder and piston unit 158 by a lever 308 which is pivotally connected at 309 with the piston rod 158a, which is fulcrumed at 310, and which makes a pin and slot connection 311 with the rack 302. In order that the rate of travel of the two racks may be the same, the lever arms of the levers 304 and 308 are the same length, and their respective pin and slot connections to the racks 302 and 301 are the same distances from the respective pivots 305 and 309.

As best seen in FIG. 10, the pinion is provided with a spindle forming an axial actuating finger 312 which projects between closely spaced first and second limit switches 313 and 314, which have their respective plungers 313a and 314a in opposed positions where either of them may be contacted by the pinion spindle 312 upon movement of the pinion from its neutral position in the racks.

It is apparent from the foregoing description of the sensing means 300 that, with the spindle 312 normally positioned in the vertical plane of the wire W, as long as the auxiliary rams move at the same speed the spindle 312 will remain in that plane. If, however, the auxiliary ram 55 moves faster than the auxiliary ram 56 on an extrusion stroke, it will cause the upper rack 301 to roll the pinion 303 to the right as viewed in FIG. 9 where the spindle 312 may contact the limit switch plunger 313a. Conversely, if the ram 56 moves faster than the ram 55 on the extrusion stroke, the lower rack 302 will move faster and cause the pinion to move to the left so the spindle contacts the limit switch plunger 314a. On a return stroke, if the ram 55 lags behind the ram 56 it will cause the pinion to be moved to the left, as viewed in FIG. 9, by reason of the greater speed of the lower rack 302. The opposite occurs, of course, if the auxiliary ram 56 lags on a return stroke.

The low pressure hydraulic system 315 (FIG. 4a) for coordinating the relative rates of travel of the auxiliary rams 55 and 56 includes a pump 316 which is driven from the variable speed motor 89 as shown in FIG. 4, and operates at a pressure of 200 to 300 p.s.i.

A hydraulic line 317 connects the suction side of pump 316 with the sump 90, and a line 318 from the pressure side of the pump splits into branch lines 319 and 320 which are provided, respectively, with two position, three connection directional valves 321 and 322. A line 323 connects the valve 321 to the front of the cylinder 157 that operates the auxiliary ram 55, and a line 324 connects said valve 321 to the sump 90. A line 325 connects the valve 322 to the front of the cylinder and piston unit 158, and a line 326 connects said valve 322 to the sump 90.

Each of the valves is seen to be of the type which is spring-urged to a normal position in which hydraulic fluid from the pump 316 returns to the sump 90. The valves are provided, respectively, with actuating solenoids 321a and 322a so that energization of the valve solenoid opens the valve to the pressure line for the respective cylinder and piston unit 157 or 158, as the case may be.

The limit switch 313 in the sensing means is connected by wires 313b and 313c to the solenoid 321a of valve 321, while the limit switch 314 is connected by wires 314b and 314c to the solenoid 322a of the valve 322. Thus, actuation of the limit switch plunger 313a opens the valve 321 to supply low pressure fluid to the front of the cylinder and piston unit 157, while actuation of the limit switch plunger 314a opens the valve 322 to admit low pressure hydraulic fluid to the front of the cylinder and piston unit 158.

Contact of the pinion spindle 312 with the plunger 313a always means that the ram 55 is closer to the wire W than is the ram 56, and to correct this the low pressure fluid must be admitted to the front of the unit 157 regardless of whether the rams are on an extruding stroke or a return stroke. On an extruding stroke the admission of fluid to the front of the unit 157 delays the ram 55 to permit the ram 56 to catch up, while on a return stroke if the ram 55 is lagging the admission of fluid to the front of the unit 157 boosts the ram 55 to cause it to catch up. Conversely, if the ram 56 is closer to the wire on an extruding stroke or on a return stroke the plunger 314a is contacted and low pressure fluid is admitted to the front of unit 158.

OPERATION

A very satisfactory system for making the device operate automatically by means of electrical switches, solenoids, valves and in some cases, air pressure is illustrated in FIGS. 5 and 6. Most of the parts illustrated in FIGS. 5 and 6 have already been described and the remaining parts will be described in connection with the description of one cycle of the automatic operation of the device as illustrated by FIGS. 5 and 6. In FIGS. 5 and 6, the electrical wiring has been omitted to simplify the drawings. If the main ram 54 is in its uppermost position and the power is turned on, cam 291 actuates switch 225. Switch 225 energizes solenoids 271 and 272 of valves 273 and 274, respectively (FIG. 6), causing cylinders 275 and 276 to assume the position shown in FIG. 6 and shift valve 187 to neutral or closed port position (as shown in FIG. 5), thus locking off oil flow to cylinders 184 and 184'. Switch 225 also energizes solenoid 262 which trips billet release pawl 261 allowing a single billet 9 to discharge from preheating furnace 260. The released billet 9 rolls by gravity onto the open jaws of the billet transfer device 266. A cat-whisker type of switch 263 senses the billet in the jaws and energizes solenoid 277 of valve 278 causing the billet transfer mechanism 266 to advance. As the transfer mechanism advances, the spring loaded upper jaw 266' closes against the billet and jaws are rotated 90° by cam action, during the stroke of cylinder 278, for example, and arrives at a position directly over the main bore 10 of the extruding die. In this position of the transfer device 266 the jaws are mechanically opened dropping the billet into die cavity 10. Switch 265 is tripped operating solenoid 279 (FIG. 6) of valve 273 causing air cylinder 275 to advance thereby shifting control 280 for valve 187 to down position thus supplying pressure to cylinder 184' and exhausting cylinders 184. Switch 265 also de-energizes solenoid 262 which resets the billet release pawl 261 and allows all billets at the furnace to advance one position.

As the main ram 54 advances, the switch 264 is tripped energizing solenoid 281 of valve 278 causing the transfer mechanism 266 to retract with the jaws open to receive a billet on the next cycle. As the ram 54 continues into the die chamber 10, the resistance to movement of the ram increases causing pressure to build up in chamber 184' to a predetermined amount at which time pressure switches 282 and 283 are tripped, switch 282 deenergizing solenoid 284 of valve 223 and shifting this valve to the low pressure air supply of pressure regulator 221. The high pressure of the auxiliary ram high pressure hydraulic system is gradually relieved through valve 221 until the predetermined low pressure setting is reached.

As the pressure on the auxiliary rams 55 and 56 is being relieved, the main ram 54 forces the metal to be extruded past ball check valve 21 (see FIGS. 1, 2 and 7) and hence to accumulator chambers 31 and 32 and extruder passage 43 (FIG. 2) at a pressure and at a rate sufficient to recharge the accumulator chambers 31 and 32 and still maintain continued and uninterrupted flow through said extruder passage 43.

As main ram 54 nears the end of its extrusion stroke, the cam 291 on the cross-head trips switch 224, which energizes solenoid 284 to shift valve 223 to the high pressure air supply regulated by 222. The pressure builds up in the auxiliary ram high pressure to a predetermined setting at which point pressure switch 285 is tripped to energize solenoids 271 and 272 (FIG. 6) of valves 273 and 274, causing air cylinders 275 and 276 to retract control 280 of valve 187 to neutral position and thus lock off all oil flow to or from cylinders 184 and 184'. At the same time pressure switch 285 energizes solenoid 286 to open valve 212 and allow oil from cylinder 184' to bleed off through flow control valve 213. As the pressure in cylinder 184' decreases, the high pressure at the side rams gradually forces the ball check valve 21 to close (to the position in FIG. 2) against its upper seat 19.

When the pressure in cylinder 184' is lowered to a predetermined value, pressure switch 283 trips, thus deenergizing solenoid 286 of valve 212 closing said valve and energizing solenoid 287 of valve 274 (FIG. 6) causing air cylinder 276 to advance and shift control 280 of valve 187 to up position thereby supplying pressure to cylinders 184 and exhausting chamber 184', to withdraw ram 54 from die cavity 10 and return to the top of its stroke where it will again actuate limit switch 225 and start a new cycle. During the return stroke of ram 54 the limit switch 264 is reset. Thus, the ball check valve 19-21 allows the auxiliary rams 55 and 56 to maintain the extrusion pressure while the main ram 54 is withdrawn and while a new billet is loaded into the die cavity 10.

During the entire cycle the relative speed of the auxiliary rams is continuously equalized by the sensing means 300 and low pressure hydraulic system 315.

Tension is applied to the clad wire W1 in the direction shown by the arrow at the bottom of FIG. 8, as by a capstan (not shown) so that the wire W is pulled through the die head 41.

EXAMPLE

As indicated above, one of the unexpected features of the invention is the discovery that a firmly bonded aluminum clad wire or strip is obtained when the aluminum is applied to a core at sufficiently high pressure. It has not been possible to measure the exact minimum pressure on the extruded metal required to obtain bonding since there are many factors to be considered. Such factors include the nature of the metal or alloy being extruded, the temperature of extrusion, the speed of extrusion, the ratio of cross-sectional area of the charge ram to the rams of the accumulating chambers, the physical design of the internal check valve and passages, the basic size of the core, the ratio of cross-sectional area of sheath to core, etc.

In a typical example, however, EC grade aluminum is extruded at a temperature of about 1,020 F. about a steel core wire of .190" diameter. A pressure of 100,000 p.s.i. on the aluminum at the charge ram face and 60,000 p.s.i. on the aluminum at the auxiliary ram faces is effective in producing a firmly bonded layer of aluminum about .024" thick on said steel core wire. For purposes of the present disclosure, a "firm bond" is one which permits the clad wire to be reduced by drawing through dies without damage to the bond.

The features and principles underlying the invention described above in connection with specific exemplifications will suggest to those skilled in the art many other modifications thereof. It is accordingly desired that the appended claims shall not be limited to any specific feature or details thereof.

We claim:

1. Apparatus for continuously bonding an extruded coating of a soft metal onto a hard metal core to provide a clad wire, said apparatus comprising, in combination:

a die holder including a billet chamber for a soft metal billet, first and second opposed accumulator chambers, a bore through the die holder that has its axis perpendicular to a projection of the longitudinal center line of the billet chamber and midway between the accumulator chambers, a valve chamber at the inner end of the billet chamber, and a pair of flow passages connecting the valve chamber to the accumulator chambers and to diametrically opposed areas of said bore;

a main ram in the billet chamber and first and second auxiliary rams in the respective accumulator chambers, each said ram having an extruding stroke toward the bore and a return stroke away from the bore;

valve means in said valve chamber, said valve means being adapted to pass material from the billet chamber upon the extruding stroke of the main ram and seal the billet chamber upon the extruding stroke of the accumulator rams;

an extruding head in said bore, said head having a male die member through which a hard metal core to be clad enters the head on the axis of the bore, a female die member spaced from the male die member for compressing the soft metal around the hard metal and bonding them together, and an extruder passage through which soft metal from the flow passages enters the space between the die members;

high pressure hydraulic means for advancing the main ram in an extruding stroke;

means for returning said main ram;

high pressure hydraulic means for advancing the auxiliary rams in an extruding stroke;

control means for terminating the extruding stroke of the main ram and simultaneously starting the extruding stroke of the auxiliary rams, and for terminating the extruding stroke of the auxiliary rams and simultaneously starting the extruding stroke of the main ram, whereby said main ram may extrude soft metal into the extruding head and the accumulator chambers on its extruding stroke and the auxiliary rams may extrude soft metal into the extruding head on their extruding stroke while the valve means seals the billet chamber; and means for equalizing the rate of travel of the auxiliary rams on their extruding stroke and on their return stroke to maintain equal flow of soft metal through the opposed flow passages to the extruder passage.

2. The apparatus of claim 1 in which the equalizing means comprises means for sensing inequality in the distances of the auxiliary rams from the axis of the bore, and means actuated by said sensing means for exerting pressure on the low pressure side of the ram that is nearer the axis of the bore.

3. The apparatus of claim 2 in which the sensing means includes a pair of spaced control members having first and second opposed actuators, and a movable actuating member between said actuators the position of which is controlled by movement of both auxiliary rams so that more rapid movement of the first ram causes the actuating member to operate the first actuator while more rapid movement of the second ram causes the actuating member to operate the second actuator.

4. The apparatus of claim 3 which includes a low pressure hydraulic system connected to the low pressure sides of both auxiliary rams, a first valve controlling the flow of fluid in said system to the low pressure side of the first ram, a second valve controlling the flow of fluid in said system to the low pressure side of the second ram, means responsive to operation of the first actuator for opening the first valve, and means responsive to operation of the second actuator for opening the second valve.

5. In metal extruding apparatus which includes an extruding head having a longitudinal axis with an extruder passage on said axis, first and second opposed material receiving chambers communicating with said passage and equidistant from said axis, first and second rams in said respective chambers, first and second driving means for said rams having a front side and a rear side, means for applying a large force to the rear side of each of said driving means to simultaneously move said rams toward said passage in an extruding stroke which forces metal into the passage, and means for moving said rams away from said passage in a return stroke, coordinating means for equalizing the rate of travel of said rams during said extruding stroke to maintain equal flow of metal to the extruder passage, said coordinating means comprising, in combination: means for applying a relatively small force to the front side of each of said driving means, said small force applying means including a low pressure hydraulic system having first and second lines connected to conduct hydraulic fluid to the front sides of the respective first and second driving means, and first and second normally closed control valves in said respective lines operable to selectively admit said hydraulic fluid to one or the other of said lines; means for sensing inequality in the distances of said rams from the axis of the passage; and actuating means controlled by said sensing means for selectively opening one or the other of said valves to apply said small force to the front of the driving means for the one of said rams which is closer to said axis from time to time on an extruding stroke.

6. The combination of claim 5 in which the actuating means includes first and second opposed actuators which control, respectively, the opening of the first and second valves, and in which the sensing means includes a movable actuating member between said actuators and means for moving said actuating member toward the actuator that controls the opening of the valve for the ram that is closer to the axis of the extruding head.

7. The combination of claim 6 in which the actuating means includes first and second opposed actuators which control, respectively, application of a small force to the fronts of the first and second driving means, and in which the sensing means includes a movable actuating member between said actuators and means for moving said actuating member toward the actuator that controls the application of force to the front of the driving means for the ram that is closer to the axis of the extruding head.

8. In metal extruding apparatus which includes an extruding head having a longitudinal axis with an extruder passage on said axis, a billet chamber, a main ram in said chamber for extruding metal into said passage on a pressure stroke, first and second opposed metal receiving chambers communicating with said passage and equidistant from said axis, said chambers receiving metal from said main ram during said pressure stroke, first and second auxiliary rams in said respective chambers, said auxiliary rams being moved in a return stroke by flow of metal into said receiving chambers during said pressure stroke, first and second driving means for said first and second auxiliary rams, each said driving means having a front side and a rear side, means for applying a large force to the rear side of each of said driving means to simultaneously move said auxiliary rams toward said passage in an extruding stroke which forces metal into the passage, coordinating means for equalizing the rate of travel of said auxiliary rams on their extruding stroke and on their return stroke to maintain equal flow of metal to the passage at all times, said coordinating means comprising, in combination: means for applying a relatively small force to the front side of each of said driving means; means for sensing inequality in the distances of said rams from the axis of the passage; and actuating means controlled by said sensing means for selectively applying said small force to the front of the driving means for the one of said rams which is closer to said axis from time to time on an extruding stroke or on a return stroke.

References Cited

UNITED STATES PATENTS 2,969,873  1/1961  Billen et al. _____ 72—259 X

FOREIGN PATENTS

| | | |
|---|---|---|
| 200,295 | 11/1955 | Australia. |
| 738,514 | 10/1955 | Great Britain. |
| 702,505 | 1/1954 | Great Britain. |
| 382,791 | 11/1932 | Great Britain. |
| 1,040,485 | 10/1958 | Germany. |

CHARLES W. LANHAM, Primary Examiner

A. L. HAVIS, Assistant Examiner

U.S. Cl. X.R.

18—12, 13, 30; 91—171; 72—259